G. F. McKENNA.
METAL CUFF FOR AUTOMOBILE WHEELS.
APPLICATION FILED JAN. 6, 1920.
1,368,952.
Patented Feb. 15, 1921.
2 SHEETS—SHEET 2.
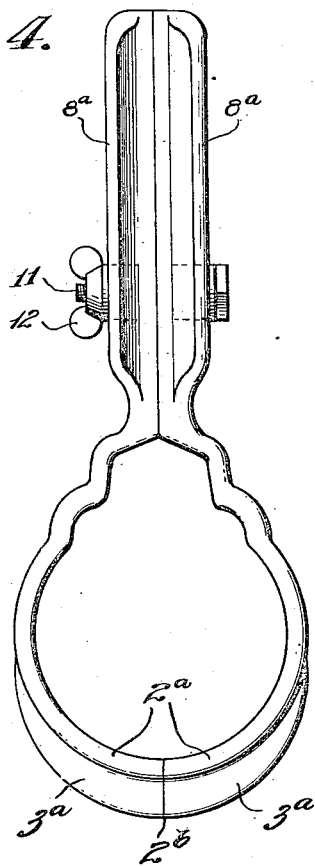
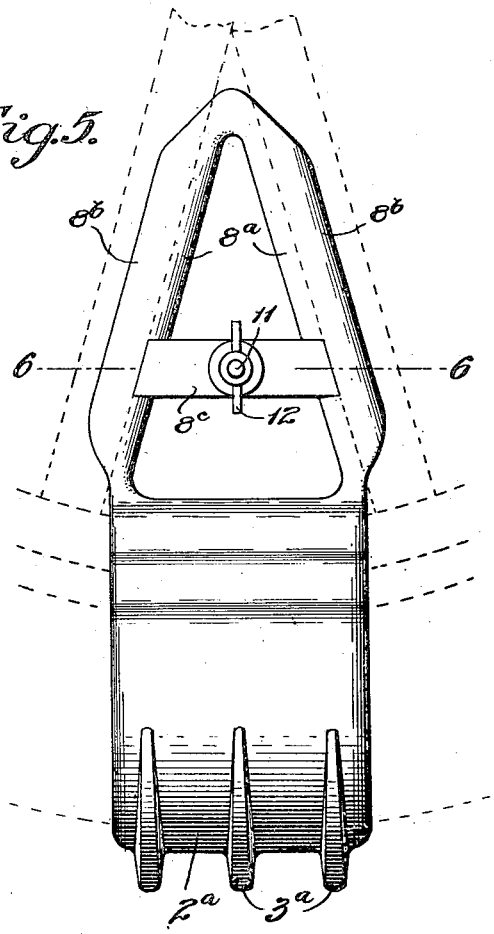
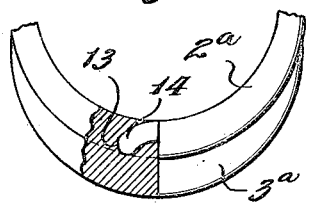
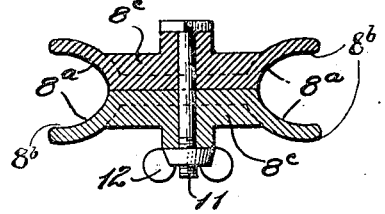
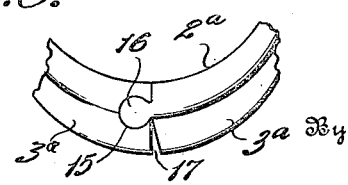
Inventor
George F. McKenna,
By Wm. Fletcher & Co.
Attorney

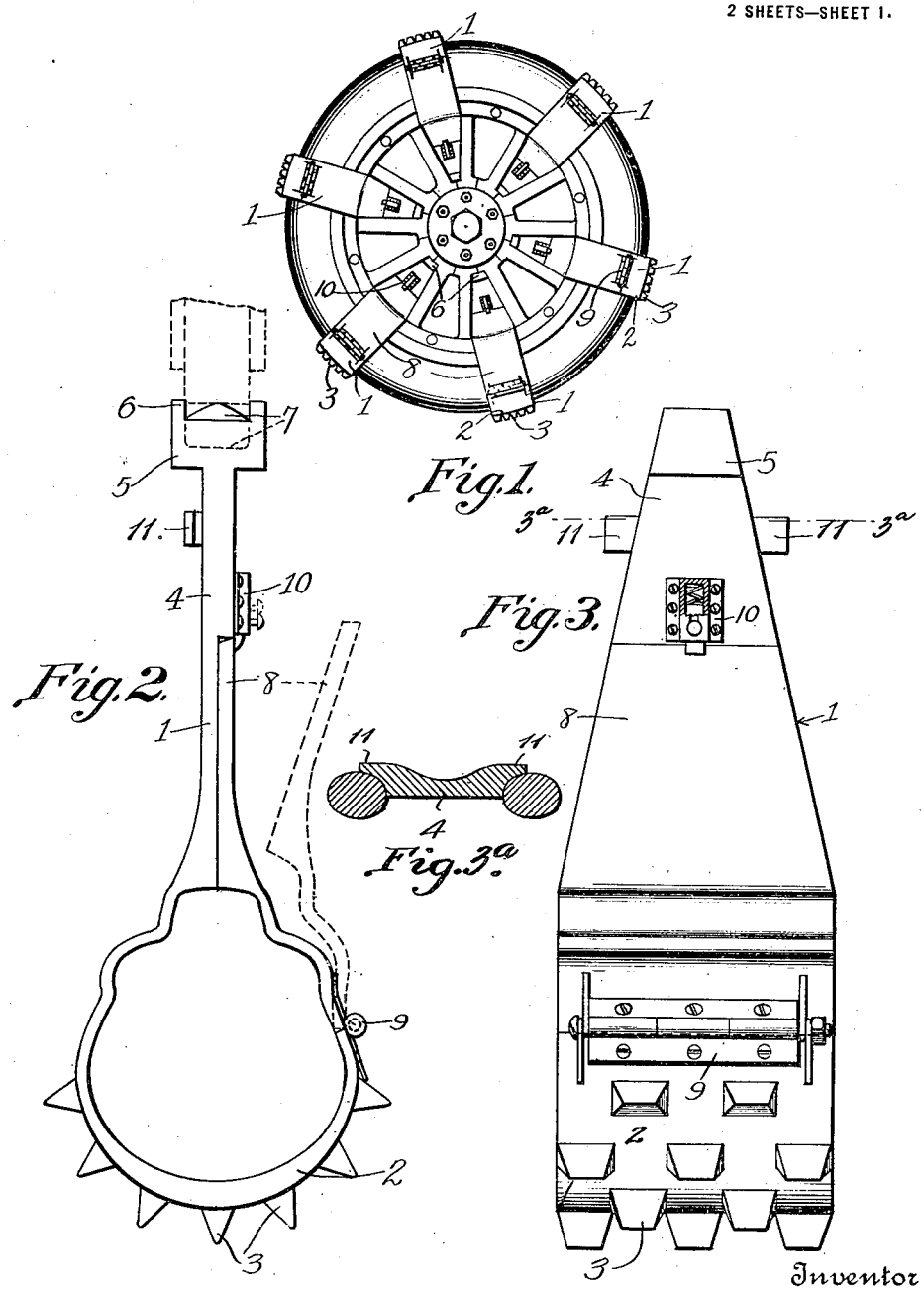

UNITED STATES PATENT OFFICE.

GEORGE F. McKENNA, OF NITRO, WEST VIRGINIA.

METAL CUFF FOR AUTOMOBILE-WHEELS.

1,368,952.  Specification of Letters Patent.  Patented Feb. 15, 1921.

Application filed January 6, 1920. Serial No. 349,754.

*To all whom it may concern:*

Be it known that I, GEORGE F. McKENNA, a citizen of the United States, residing at Nitro, in the county of Putnam and State of West Virginia, have invented certain new and useful Improvements in Metal Cuffs for Automobile-Wheels; and I do hereby declare the following to be a full, clear, and exact description of the invention, such as will enable others skilled in the art to which it appertains to make and use the same.

This invention relates to anti-slipping devices adapted to be applied to vehicle wheels, particularly those tired with rubber, and an object thereof is to provide an efficient device of this character that will not slip on, or materially cut, or wear a rubber tire. It is especially intended for use on an automobile wheel when the vehicle is mired in a mud hole. The device is so designed that it can easily be placed in position upon the wheel without the use of jack, wrenches, chains or anything that is difficult to handle. It can be applied upon the wheel by a person standing upon the running board.

My invention comprises an anti-slipping collar or cuff-like member, having calks or ribs on its tread portion, adapted to encircle a felly and rubber tire, and having also a radial shank member adapted to fit snugly between two spokes, said collar and shank members consisting of two complemental parts separable laterally, each part comprising a portion of the shank and collar member.

When a car is mired and one or more of my devices are applied to the driving wheel or wheels and the engine started, the cuff will obtain a good grip upon the ground and cannot move along the tire owing to its firm seat between the spokes.

In the accompanying drawings,

Figure 1 shows a wheel with several of my attachments applied to it.

Fig. 2 is an edge elevation of one form of the attachment.

Fig. 3 is a side elevation thereof.

Fig. 3ᵃ is a section on line 3ᵃ—3ᵃ of Fig. 3.

Fig. 4 is an edge elevation of a modified form.

Fig. 5 is a side elevation of the device shown in Fig. 4.

Fig. 6 is a section on line 6—6 of Fig. 5.

Fig. 7 is a detail of one means for interlocking two parts of the cuff at the tread portion.

Fig. 8 is a detail of another means for interlocking the two parts at the tread.

Referring to the embodiment of the invention illustrated on sheet 1, the attachment as a whole is indicated by the numeral 1. It comprises a felly and tire-encircling collar-member designated 2. This collar-member is provided on its tread portion with calks or other anti-skidding devices 3, which may be riveted to the collar or otherwise attached or formed thereon as may be desirable; 4 designates a wedge-form shank portion extending from the collar member 2, and of such length that its end will bear upon the hub at the cheeks of the spokes; 5 is a head terminating on the shank member 4 and provided with a seat in which is confined a resilient member 7, such as a block of rubber or other elastic body; flanges 6 bound two opposite sides of the resilient block and are adapted to very slightly overlap the cheeks of adjacent spokes. In order that the device may readily be attached I have provided a hinged section 8 that is adapted to be opened and allow the collar to be slipped over the felly and tire of the wheel to which it is to be attached. This member is shown as hinged at 9 to the collar member and as adapted to be locked to the shank in closed position by the spring latch 10. I have shown a separate hinge bolted or riveted to the attachment; obviously the hinge may be formed integral with the material. Lugs 11 may project from opposite sides of the member 4 in such position as to engage behind two spokes at a point between the spokes and the brake-drum for purposes of greater security.

I may form the parts by stamping and bending from sheet metal, but it may be manufactured by any other known process from any suitable material as, for example, by casting.

In using the described form of the anti-slipping device the hinge section 8 will be opened, the device slipped over the felly and tire of a vehicle wheel and the shank seated between the spokes with the resilient block 7 resting against the throat or adjoining cheek portions of adjacent spokes. Thus it is adapted to transmit pressure from the tread to the hub and, owing to the wedge like or taper form of the shank it will seat firmly between two adjacent spokes when heavy pressure is applied and a part of the stress will be borne by the spokes throughout their length as well as by the hub of the wheel. By this construction it will be obvious that heavy pressure on the tread of the collar member will be borne in part by the spokes and hub and will thereby relieve the wear of the device upon the rubber tire and prolong its life; the danger of cutting the tire that is incident to anti-skidding devices supported solely upon the tire and yielding to the full extent of the deformation of the tire when in use will be minimized.

As an alternative form of cuff, which may be cheaply made for the reason that molds for both parts may be made from the same pattern, I have devised the construction illustrated in Fig. 4. The parts $8^a$ $8^a$ meet between two spokes and have flanges $8^b$ overlapping the front and rear faces of the spokes. The tread portions $2^a$ abut at $2^b$ and each tread portion $2^a$ is provided with anti-slipping ribs $3^a$. The parts $8^a$ are adapted to be secured in place by means of a bolt 11 and nut 12. The parts $8^a$ may be open between the sides except for the bridge pieces $8^c$ through which the bolt 11 passes.

In case it is desired to interlock the meeting portions of the tread portions $2^a$ orifices 13 may be formed in one of said members and hook-like lugs 14 on the other as shown in Fig. 7. Or, an under-cut groove 15 may be formed in one and a cylindrical rib 16 in the other as shown in Fig. 8. In the latter form one of the members $2^a$ should have clearance as shown at 17.

The modified forms shown in Figs. 4 to 8 inclusive, should be applied by first putting in place the member that goes on the inner side of the wheel and then applying the outer member and bolting them together. In the use of the forms illustrated in Figs. 7 and 8, the members having the hole 13 or groove 15, as the case may be, should be placed on the inside.

Having thus described my invention and set forth its mode of use, what I desire to claim and secure by Letters Patent is as follows:

1. An anti-skid attachment for wheels comprising a collar member adapted to embrace the rim and tire of a wheel and a shank member formed and adapted to fit between and against adjacent spokes, said shank and collar members consisting of two complemental parts adapted to be separated by relative lateral movement, said parts consisting of a portion of the shank and a portion of the collar member, respectively, and means for securing said parts together in position on a wheel.

2. An anti-skid attachment for wheels comprising a collar like portion adapted to encircle the felly and tire of a wheel, and a shank portion adapted to seat against and between adjacent spokes, said attachment being in two parts to permit the attachment to be applied to a wheel, one of said parts having lugs adapted to bear against the rear sides of adjacent spokes.

3. An anti-skid attachment for wheels comprising a tread portion adapted to fit over a wheel-tread and a shank portion of a length to reach the hub and provided with a resilient thrust member at its end.

4. An anti-skid attachment for wheels comprising a collar like member adapted to encircle the felly and tire of a wheel, and a shank portion of a length to thrust at its end against the hub, and a movable section adapted to be opened to permit the attachment to be fitted to a wheel.

5. An anti-skid attachment for wheels comprising a collar like member adapted to encircle the felly and tire of a wheel, and a shank portion of a length to thrust against the hub, said shank and collar member being formed in part by a hinged section adapted to be locked in closed position.

In testimony whereof I affix my signature.

GEORGE F. McKENNA.